United States Patent
Xu et al.

(10) Patent No.: US 11,295,437 B2
(45) Date of Patent: Apr. 5, 2022

(54) AUTHENTICATION METHOD AND SYSTEM

(71) Applicant: Alipay Labs (Singapore) Pte. Ltd., Singapore (SG)

(72) Inventors: Yan Xu, Hangzhou (CN); Jiangbo Huang, Hangzhou (CN)

(73) Assignee: ALIPAY LABS (SINGAPORE) PTE. Ltd., Singapore (SG)

( * ) Notice: Subject to any disclaimer, the term of this patent is extended or adjusted under 35 U.S.C. 154(b) by 0 days.

(21) Appl. No.: 17/356,379

(22) Filed: Jun. 23, 2021

(65) Prior Publication Data

US 2022/0028057 A1  Jan. 27, 2022

(30) Foreign Application Priority Data

Jul. 24, 2020  (SG) .......................... 10202007133Q (51) Int. Cl.
*G06T 7/00* (2017.01)
*B42D 25/22* (2014.01)
*B42D 25/23* (2014.01)

(52) U.S. Cl.
CPC ............ *G06T 7/0008* (2013.01); *B42D 25/22* (2014.10); *B42D 25/23* (2014.10); *G06T 2207/30176* (2013.01)

(58) Field of Classification Search
None
See application file for complete search history.

(56) References Cited

U.S. PATENT DOCUMENTS

| 10,385,514 | B1 * | 8/2019 | Jones ...................... D21H 21/48 |
| 10,769,263 | B1 * | 9/2020 | Guo ......................... G06T 7/136 |
| 2011/0164805 | A1 | 7/2011 | Blair et al. |
| 2018/0186164 | A1 * | 7/2018 | Wu ................... G06K 19/06103 |
| 2018/0322357 | A1 * | 11/2018 | Chen ......................... G06T 7/73 |

(Continued)

FOREIGN PATENT DOCUMENTS

CN   108921217   11/2018

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Vikkram Bali
(74) *Attorney, Agent, or Firm* — Fish & Richardson P.C.

(57) ABSTRACT

Disclosed are computer-implemented methods, non-transitory computer-readable media, and systems for authentication. One computer-implemented method includes obtaining a first image, where the first image is an image of an identification (ID) document captured when the ID document is tilted at a first angle relative to a projected light source. A second image is obtained, where the second image is an image of the ID document captured when the ID document is tilted at a second angle relative to the projected light source. The ID document is authenticated based on identification of a first illuminated region and a second illuminated region, where the first illuminated region is associated with the first image and the second illuminated region is associated with the second image, and a comparison between a first position of the first illuminated region and a second position of the second illuminated region.

20 Claims, 5 Drawing Sheets

(56) References Cited

U.S. PATENT DOCUMENTS

2019/0308432 A1    10/2019  Van Den Berg et al.
2020/0234309 A1*   7/2020   Arora .................... G06F 16/93
2021/0064901 A1*   3/2021   Vorobiev ............ G06K 9/00288

OTHER PUBLICATIONS

Nakamoto, "Bitcoin: A Peer-to-Peer Electronic Cash System," www.bitcoin.org, 2005, 9 pages.

* cited by examiner

AUTHENTICATION METHOD AND SYSTEM

CROSS-REFERENCE TO RELATED APPLICATIONS

This application claims priority to Singapore Patent Application No. 10202007133Q, filed on Jul. 24, 2020, which is hereby incorporated by reference in its entirety.

TECHNICAL FIELD

The present specification relates broadly, but not exclusively, to an authentication method and to an authentication system.

BACKGROUND electronic-Know Your Customer (eKYC) is a digital due diligence process performed by a business entity or service provider to verify the identity of its customers to prevent falsification of identity. eKYC processes typically include a series of checks conducted at the initial stage of the relationship with the customers to verify their identities. Many eKYC processes involve potential customers submitting photographs of their official identification (ID) documents, e.g. ID card, driving license, passport, etc. The photographs may then be analyzed to verify the customers' identities.

In a typical eKYC process, a customer is takes a photograph of his/her ID document. However, some attackers may use fraudulent ID documents, screenshots of genuine ID documents or high resolution copies of genuine ID documents, during the eKYC processes.

A need therefore exists to improve the manner in which an ID document can be authenticated.

SUMMARY

Embodiments seek to provide an authentication method and an authentication system which involve projecting light onto an ID document, obtaining at least two images of the ID document captured when the ID document is tilted at different angles relative to the light source, identifying illuminated regions on the ID document images, and comparing the positions of the illuminated regions on the ID document images. The ID document can be authenticated based on two conditions: the identification of the illuminated regions on the ID document images; and the comparison between the positions of the illuminated regions on the ID document images.

According to one embodiment, there is provided an authentication method, comprising: obtaining a first image, wherein the first image is an image of an identification (ID) document captured when the ID document is tilted at a first angle relative to a light source whilst a light from the light source is projected thereon; obtaining a second image, wherein the second image is an image of the ID document captured when the ID document is tilted at a second angle relative to the light source whilst the light from the light source is projected thereon; and authenticating the ID document based on identification of a first illuminated region and a second illuminated region, wherein the first illuminated region is associated with the first image and the second illuminated region is associated with the second image, and a comparison between a first position of the first illuminated region and a second position of the second illuminated region.

According to another embodiment, there is provided an authentication system, comprising: an image obtaining device to: obtain a first image, wherein the first image is an image of an identification (ID) document captured when the ID document is tilted at a first angle relative to a light source whilst a light from the light source is projected thereon, and obtain a second image, wherein the second image is an image of the ID document captured when the ID document is tilted at a second angle relative to the light source whilst the light from the light source is projected thereon; and an authenticating device to authenticate the ID document based on identification of a first illuminated region and a second illuminated region, wherein the first illuminated region is associated with the first image and the second illuminated region is associated with the second image, and a comparison between a first position of the first illuminated region and a second position of the second illuminated region.

According to yet another embodiment, there is provided a computing system comprising: at least one processor; a non-transitory computer-readable storage medium coupled to the at least one processor and storing programming instructions for execution by the at least one processor, the programming instructions instruct the at least one processor to: obtain a first image, wherein the first image is an image of an identification (ID) document captured when the ID document is tilted at a first angle relative to a light source whilst a light from the light source is projected thereon; obtain a second image, wherein the second image is an image of the ID document captured when the ID document is tilted at a second angle relative to the light source whilst the light from the light source is projected thereon; and authenticate the ID document based on identification of a first illuminated region and a second illuminated region, wherein the first illuminated region is associated with the first image and the second illuminated region is associated with the second image, and a comparison between a first position of the first illuminated region and a second position of the second illuminated region.

BRIEF DESCRIPTION OF THE DRAWINGS

Embodiments are provided by way of example only, and will be better understood and readily apparent to one of ordinary skill in the art from the following written description, read in conjunction with the drawings, in which.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

Embodiments will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "receiving", "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer suitable for executing the various methods/processes described herein will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the specification contained herein. Moreover, the computer program is not intended to be limited to any particular control flow. There are many other variants of the computer program, which can use different control flows.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

electronic-Know Your Customer (eKYC) is a digital due diligence process performed by a business entity or service provider to verify the identity of its customers to prevent falsification of identity. Authentication can be considered as a form of fraud detection in which legitimacy of users are verified and potential fraudsters may be detected before fraudulent acts are carried out. Effective authentication can enhance data security of systems so that digital data is protected from unauthorized users.

In a typical eKYC process, a customer is takes a photograph of his/her identification (ID) document, e.g. ID card, driving license, passport, etc. Current ID document authentication technologies may determine authenticity of an ID document by identifying moiré patterns or inconsistencies in the single ID document image. However, some attackers may use replicates of ID documents during the eKYC processes. The replicates of ID documents may include screenshots of genuine ID documents, high resolution copies of genuine ID documents or fraudulent ID documents. By making use of a single ID document image, current ID document authentication methods may not fully utilize available features of a genuine ID document to effectively authenticate the ID document. Therefore, it may be useful to make use of more than one ID document image in detecting attacks which use replicates of ID documents.

In addition, a genuine ID document may have different light reflection properties and light absorption properties as compared to a replicate of ID document. For example, when a light such as a flashlight is projected onto a genuine ID document, area(s) with higher brightness such as bright spot(s) may be observed on the ID document as the genuine ID document reflects the light. On the other hand, when the same light is projected onto a replicate of ID document, the area(s) with higher brightness may not be observed on the replicate of ID document. Therefore, projecting light onto ID documents and identifying the area(s) with higher brightness on the ID documents may be useful in detecting attacks which use replicates of ID documents.

Embodiments described in the present specification may involve an eKYC process that includes two general processes: a user enrollment process and a user verification process. In the user enrollment process, a user projects light onto his/her ID document and take photographs of his/her ID document tilted at different angles relative to the light source for submission as user enrollment images. A captured image may comprise an ID document image and a background image. According to one embodiment, the user takes at least two photographs of his/her ID document tilted at different angles relative to the light source for submission as user enrollment images.

As mentioned above, a genuine ID document may have different light reflection properties and light absorption properties as compared to a replicate of ID document. When projecting light onto a replicate of ID document, area(s) with higher brightness may not be observed on the replicate of ID document. Current ID document anti-fraud methods may not be able to fully utilize the light reflection properties and light absorption properties of ID documents to detect attacks which use replicates of ID documents.

In order to reduce the success rate of attacks which use replicates of ID documents, an authentication method and/or system which involves projecting light onto an ID document, obtaining at least two images of the ID document captured when the ID document is tilted at different angles relative to the light source, identifying illuminated regions on the ID document images, and comparing the positions of the illuminated regions on the ID document images may be implemented. The ID document can be authenticated based on two conditions: the identification of the illuminated regions on the ID document images; and the comparison between the positions of the illuminated regions on the ID document images. In this implementation, the genuine ID document may not need to have security features such as holograms, multiple laser images, etc. for it to be authenticated.

The techniques described in the present specification produce one or more technical effects. The authentication method and system can reduce the success rate of attacks to the eKYC process by obtaining at least two ID document images, identifying illuminated regions on the ID document images, and comparing the positions of the illuminated regions on the ID document images. For example, if the attacker uses a replicate of ID document such as a screenshot of genuine ID document with light projected thereon as one of the user enrollment images, illuminated region(s) may not be identified for one or more of the user enrollment images. Hence, the ID document can be determined to be a replicate of an ID document at the step of identifying illuminated regions on the ID document images. As another example, if the attacker uses a replicate of ID document such as a screenshot of genuine ID document with light projected thereon as both or all of the user enrollment images, positions of illuminated regions on the user enrollment images may be the same. Hence, the ID document can be determined to be a replicate of an ID document at the step of comparing the positions of the illuminated regions on the ID document images. In other words, if illuminated regions on the ID document images are not identified and/or positions of the illuminated regions on the ID document images are the same, the ID document can be determined to be a replicate of an ID document.

Further, the authentication method and system may provide higher accuracy in authenticating an ID document. In particular, by obtaining at least two ID document images and authenticating the ID document based on two conditions—identifying illuminated regions on the ID document images and comparing the positions of the illuminated regions on the ID document images, a genuine ID document can be determined more accurately.

As mentioned above, in the user enrollment process of an eKYC process, a user projects light onto his/her ID document and take photographs of his/her ID document tilted at different angles relative to the light source for submission as user enrollment images. A captured image may comprise an ID document image and a background image. Image processing method(s) and/or system(s) may be implemented on the captured images to remove the background images and to align ID document images. Alignment of an ID document image may be based on one or more corner points of the ID document image. For example, four corner points of an aligned ID document image may correspond to four corner points of a rectangle or a square.

For example, the ID document image can be based on an "x" by "y" resolution (e.g., a 400 by 300 resolution; a 400×300 resolution where "x"=300 and "y"=400) and can be associated with one or more corner points. Input signal(s) associated with the captured image can be communicated to database(s) for processing the captured image by manner of predicative processing. The predicative processing may be based on a Convolutional Neural Network. Information concerning the corner point(s) of the ID document image may be predicted. Detection signal(s) corresponding to predicted information concerning the corner points can be received by apparatus(es) for processing (e.g., perspective transformation-based processing) to generate output signal(s) which can correspond to a processed captured image.

The processed captured image can be associated with a processed ID document image. Additionally, the aforementioned background image can be substantially reduced/eliminated as compared to the captured image. The processed ID document image can be associated with one or more corner points. Information concerning the corner point(s) of the processed ID document image can be derived/obtained/determined based on, for example, perspective transformation-based processing in respect of the corner point(s) of the ID document image. Accordingly, an aligned ID document image may be obtained.

Figure 1:
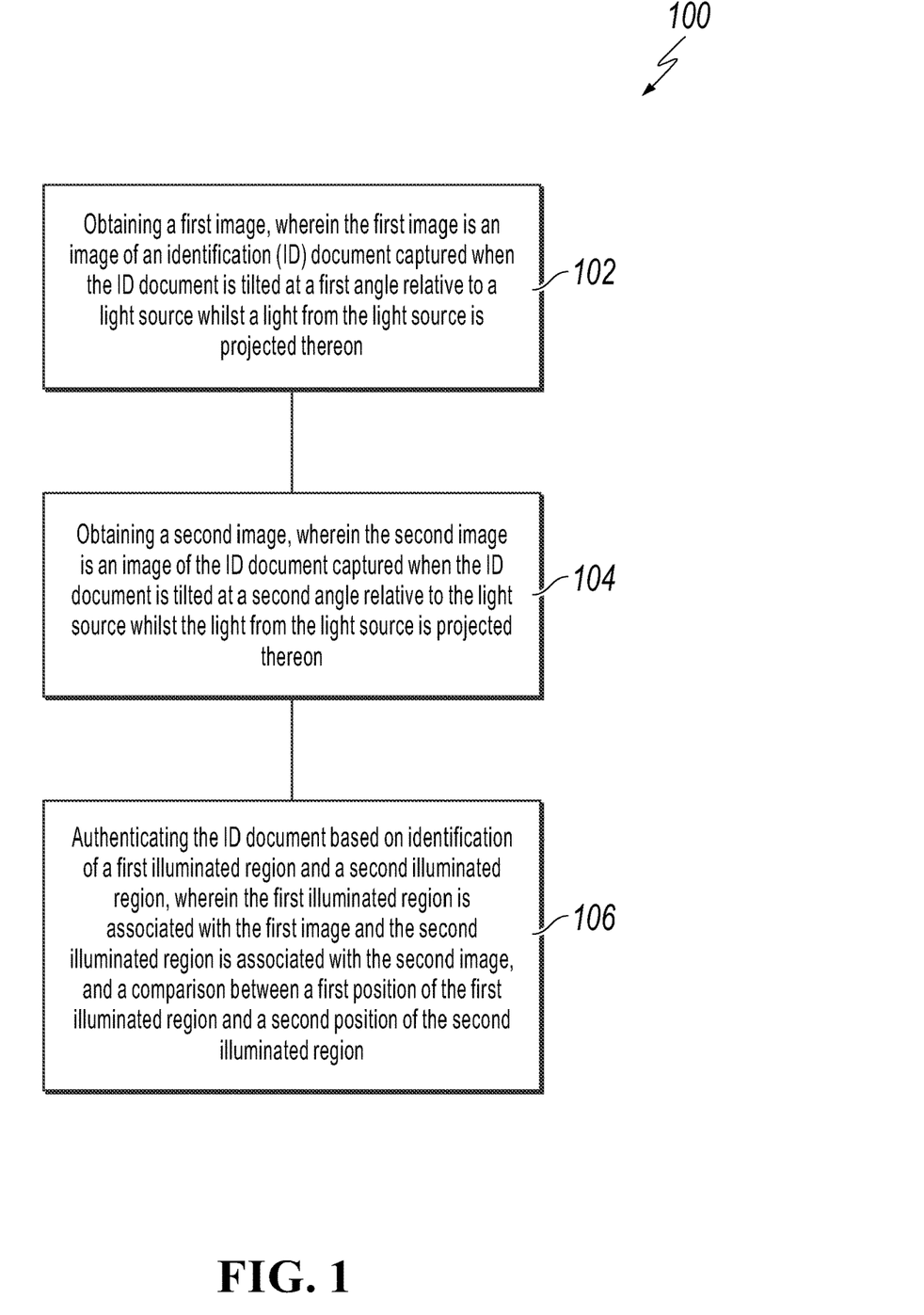
FIG. 1 is a flow chart illustrating an example of an authentication method, according to an embodiment.

FIG. 1 is a flow chart 100 illustrating an example of an authentication method, according to an embodiment. At step 102, a first image is obtained. The first image is an image of an identification (ID) document captured when the ID document is tilted at a first angle relative to a light source whilst a light from the light source is projected thereon. At step 104, a second image is obtained. The second image is an image of the ID document captured when the ID document is tilted at a second angle relative to the light source whilst the light from the light source is projected thereon. At step 106, the ID document is authenticated based on identification of a first illuminated region and a second illuminated region. The first illuminated region is associated with the first image and the second illuminated region is associated with the second image. The ID document is also authenticated based on a comparison between a first position of the first illuminated region and a second position of the second illuminated region.

In order to obtain a first image, a user projects light onto his/her ID document and take a photograph of his/her ID document at a point in time when the ID document is tilted at an angle relative to the light source while the light is projected thereon. For example, the user may place his/her ID document on a flat surface such as a tabletop, project light onto the ID document from an angle, and take a photograph of the ID document. As another example, the user may also keep the light source stationary and tilt his/her ID document such that light from the light source can be projected onto the ID document at an angle. The angle relative to the light source which the ID document is tilted at may be between 60 degrees and 80 degrees or 100 degrees and 120 degrees. The captured image may comprise an ID document image and a background image. Image processing method(s) and/or system(s) may be implemented on the captured image to remove the background image and to align the ID document image to obtain the first image. The light can be incandescence light such as flashlight, or luminescence light such as fluorescence light. Further, the light can be white light or coloured light. A light source can be obtained by executing a function, such as a flash or flashlight function, of a mobile phone.

In order to obtain a second image, the user projects the light onto his/her ID document and take another photograph of his/her ID document at another point in time when the ID document is tilted at another angle relative to the light source while the light is projected thereon. For example, the user may place his/her ID document on a flat surface such as a tabletop, project light onto the ID document from another angle, and take a photograph of the ID document. As another example, the user may also keep the light source stationary and further tilt his/her ID document such that light from the light source can be projected onto the ID document at another angle. Another angle relative to the light source which the ID document is tilted at may be between 60 degrees and 80 degrees or 100 degrees and 120 degrees, and may be different from the angle relative to the light source which the ID document is tilted at to obtain the first image. The captured image may comprise an ID document image and a background image. Image processing method(s) and/or system(s) may be implemented on the captured image to remove the background image and to align the ID document image to obtain the second image.

In some implementations, the ID document may be tilted in the same direction to obtain the first image and the second image.

As mentioned above and with reference to step 106 of FIG. 1, the ID document is authenticated based on identification of a first illuminated region and a second illuminated region. The first illuminated region and the second illuminated region may be areas with higher brightness as compared to other areas of the first image and second image, respectively. Each of the first image and second image may have one illuminated region or no illuminated region. The illuminated region can be a bright spot.

In some implementations, a function based on identification of the first illuminated region and the second illuminated region and a comparison between the first position of the first illuminated region and the second position of the second illuminated region may be used to authenticate the ID document. The function may be true when two conditions are satisfied: both the first illuminated region and the second illuminated region are identified; and the first position of the first illuminated region is different from the second position of the second illuminated region. If the function is true, the ID document can be determined to be a genuine ID document. On the other hand, if the function is false, the ID document can be determined to be a replicate of an ID document.

Figure 2:
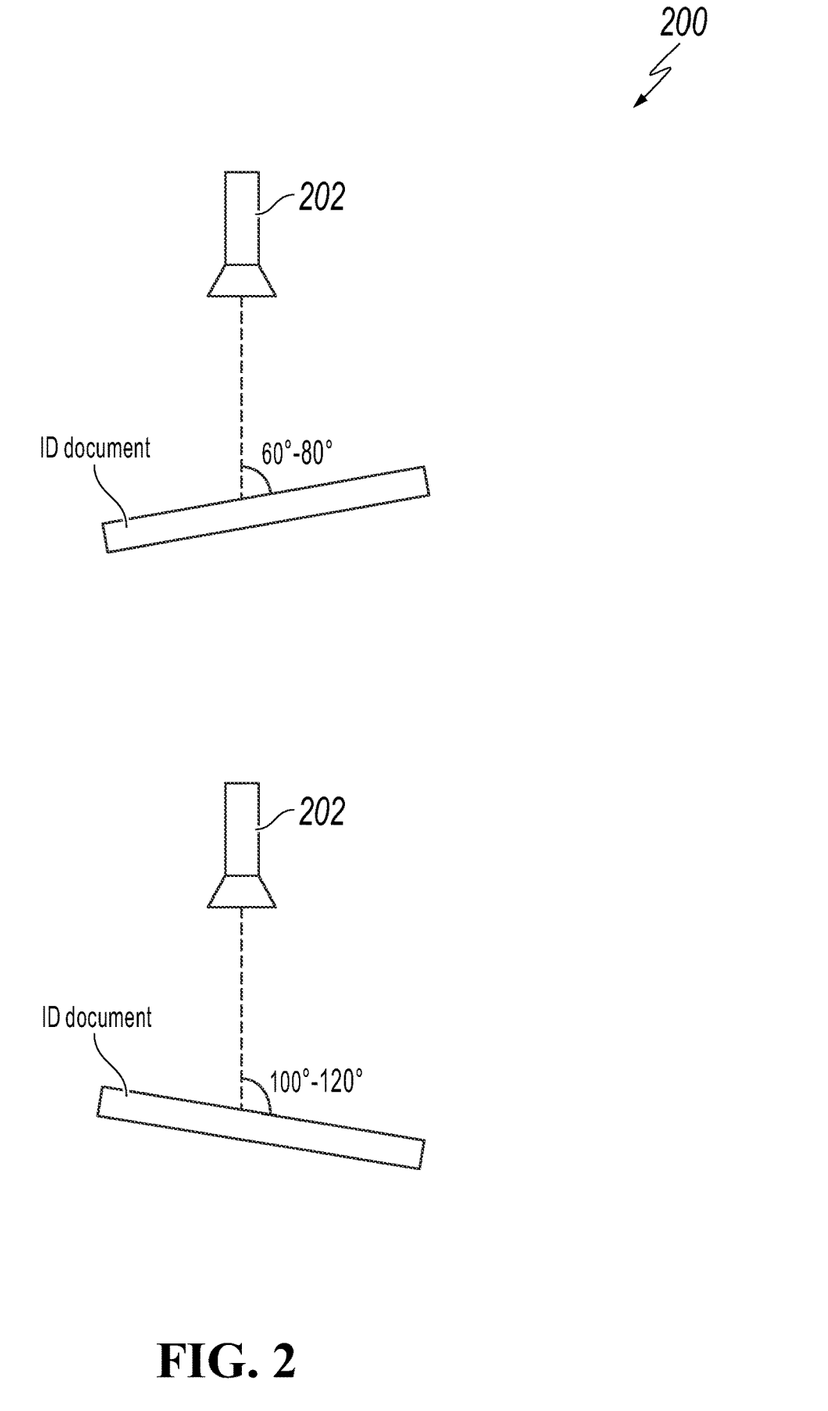
FIG. 2 is a schematic representation illustrating example positions of an identification (ID) document, according to another embodiment.

FIG. 2 is a schematic representation 200 illustrating example positions of an identification (ID) document, according to another embodiment. The first angle relative to the light source 202 which the ID document is tilted at can be between 60 degrees and 80 degrees or 100 degrees and 120 degrees. The second angle relative to the light source 202 which the ID document is tilted at can be between 60 degrees and 80 degrees or 100 degrees and 120 degrees. The second angle may be different from the first angle. As mentioned above, the ID document may be tilted in the same direction to obtain the first image and the second image. In other words, the first angle and the second angle may both be between 60 degrees and 80 degrees or may both be between 100 degrees and 120 degrees.

According to one embodiment, the light may be a flashlight.

The authentication method may further comprise performing image processing, using an image erosion method or an image dilation method, on the first image, and performing the image processing, using the image erosion method or the image dilation method, on the second image. By using the image erosion method, pixels on object boundaries in an image may be removed. In other words, pixels on boundaries of the first illuminated region and/or the second illuminated region may be removed. By using the image dilation method, pixels may be added to boundaries of objects in an image. In other words, pixels may be added to boundaries of the first illuminated region and/or the second illuminated region.

In some scenarios, image processing on both the first image and the second image may be performed using the image erosion method. Image processing on both the first image and the second image may also be performed using the image dilation method. In some other scenarios, image processing may be performed using the image erosion method on the first image and the image dilation method on the second image. Image processing may also be performed using the image dilation method on the first image and the image erosion method on the second image.

According to one embodiment, authenticating the ID document may comprise authenticating the ID document on a condition that the first illuminated region and the second illuminated region are identified, and on another condition that the first position of the first illuminated region and the second position of the second illuminated region are different.

The first angle relative to the light source which the ID document is tilted at may be smaller than the second angle relative to the light source which the ID document is tilted at, and authenticating the ID document may comprise authenticating the ID document on a condition that the first position of the first illuminated region has a shorter distance from a tilt axis than the second position of the second illuminated region from the tilt axis. The tilt axis may correspond to a width of the ID document, a height of the ID document, a diagonal axis across the ID document, or any other axis across the ID document.

According to one embodiment, authenticating the ID document may comprise determining a first coordinate. The first coordinate may correspond to a first center point of the first illuminated region. Authenticating the ID document may further comprise determining a second coordinate. The second coordinate may correspond to a second center point of the second illuminated region. Authenticating the ID document may also comprise authenticating the ID document on a condition that the first coordinate is different from the second coordinate.

Figure 3:
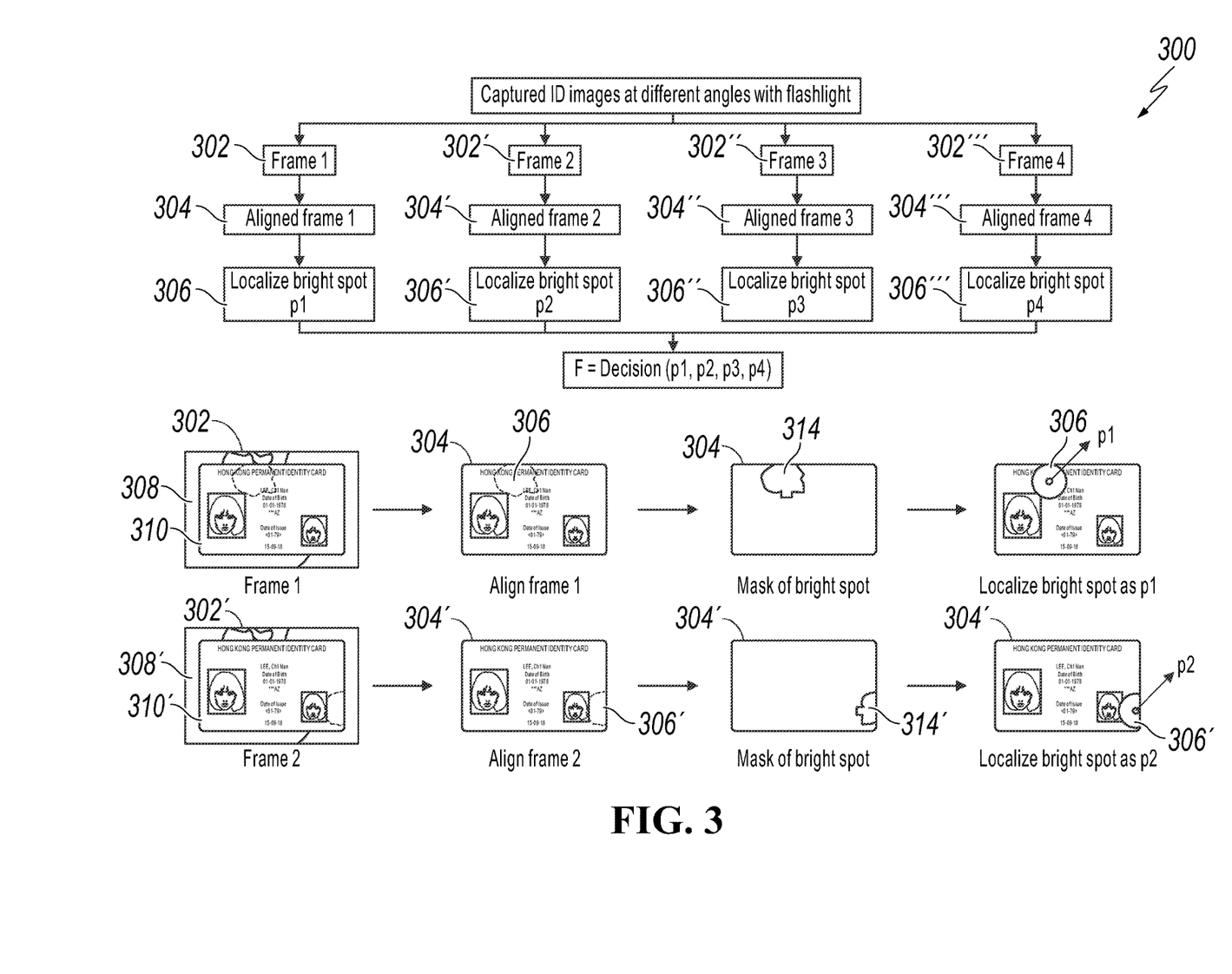
FIG. 3 is a schematic representation illustrating an example of an authentication method, according to another embodiment.

FIG. 3 is a schematic representation 300 illustrating an example of an authentication method, according to another embodiment. In this implementation, four images 304, 304', 304", 304''' may be obtained. To obtain the four images 304, 304', 304", 304''', a user projects light onto his/her ID document and take photographs of his/her ID document at four different points in time when the ID document is tilted at four different angles relative to a light source while the light is projected thereon. The light source can be obtained by executing the flash or flashlight function of a mobile phone. The user may keep the light source stationary and tilt his/her ID document such that light from the light source can be projected onto the ID document at four different angles. The angles relative to the light source which the ID document is tilted at may be between 60 degrees and 80 degrees or 100 degrees and 120 degrees. The captured images 302, 302', 302", 302''' may comprise ID document images 310, 310' and background images 308, 308'. Image processing method(s) and/or system(s) may be implemented on the captured images 302, 302', 302", 302''' to remove the background images 308, 308' and to align the ID document images 310, 310' to obtain the four images 304, 304', 304", 304'''.

Illuminated region(s) 306, 306', 306", 306''' on the four images 304, 304', 304", 304''' may be identified. The illuminated region(s) 306, 306', 306", 306''' may correspond to bright spot(s) observed on the ID document.

The authentication method may further comprise generating binary images 312, 312' based on the illuminated region(s) 306, 306', 306", 306'" identified. For each binary image 312, 312', an area of the binary image corresponding to the illuminated region(s) 314, 314' may be associated with a first pixel value, and the remaining area of the binary image may be associated with a second pixel value. The first pixel value may be different from the second pixel value. If no illuminated region 306, 306', 306", 306'" is identified, the binary image(s) 312, 312' may be associated with the second pixel value. The first pixel value may be 255 and the second pixel value may be 0.

Image processing, using an image erosion method or an image dilation method, may be performed on the four images 304, 304', 304", 304'" obtained. A center point p1, p2, p3, p4 of each of the illuminated regions 306, 306', 306", 306'" may be identified. Coordinates of each of the center points p1, p2, p3, p4 may also be determined.

A function based on identification of the four center points p1, p2, p3, p4 and a comparison between the coordinates of the four center points p1, p2, p3, p4 may be used to authenticate the ID document. The function may be true when two conditions are satisfied: all four center points p1, p2, p3, p4 are identified; and all four coordinates of the center points p1, p2, p3, p4 are different from one another. If the function is true, the ID document can be determined to be a genuine ID document. On the other hand, if the function is false, the ID document can be determined to be a replicate of an ID document.

As shown in FIG. 3, the light is projected from the left edge of the ID document towards the right edge of the ID document. Also, as shown in the first captured image 302 and the second captured image 302' of FIG. 3, the first angle relative to the light source which the ID document is tilted at is smaller than the second angle relative to the light source which the ID document is tilted at. In other words, the second captured image 302' is an image of the ID document captured when the ID document is tilted more towards the light source as compared to the first captured image 302. It can be observed that the center point p1 of illuminated region 306 has a shorter distance from the light source than the center point p2 of illuminated region 306' from the light source. The third captured image 302" can be an image of the ID document captured when the ID document is tilted more towards the light source as compared to the second captured image 302'. Similarly, the fourth captured image 302'" can be an image of the ID document captured when the ID document is tilted more towards the light source as compared to the third captured image 302".

To increase robustness of the authentication method, the function used to authenticate the ID document may be true when two conditions are satisfied: all four center points p1, p2, p3, p4 are identified; and $p1\_x < p2\_x < p3\_x < p4\_x$, where $p1\_x$ is the distance of the coordinate of center point p1 from the light source, $p2\_x$ is the distance of the coordinate of center point p2 from the light source, $p3\_x$ is the distance of the coordinate of center point p3 from the light source and $p4\_x$ is the distance of the coordinate of center point p4 from the light source.

In some implementations, a video with the ID document tilted at various different angles relative to the light source while the light is projected thereon may be captured. The authentication method may be implemented on the video.

Figure 4:
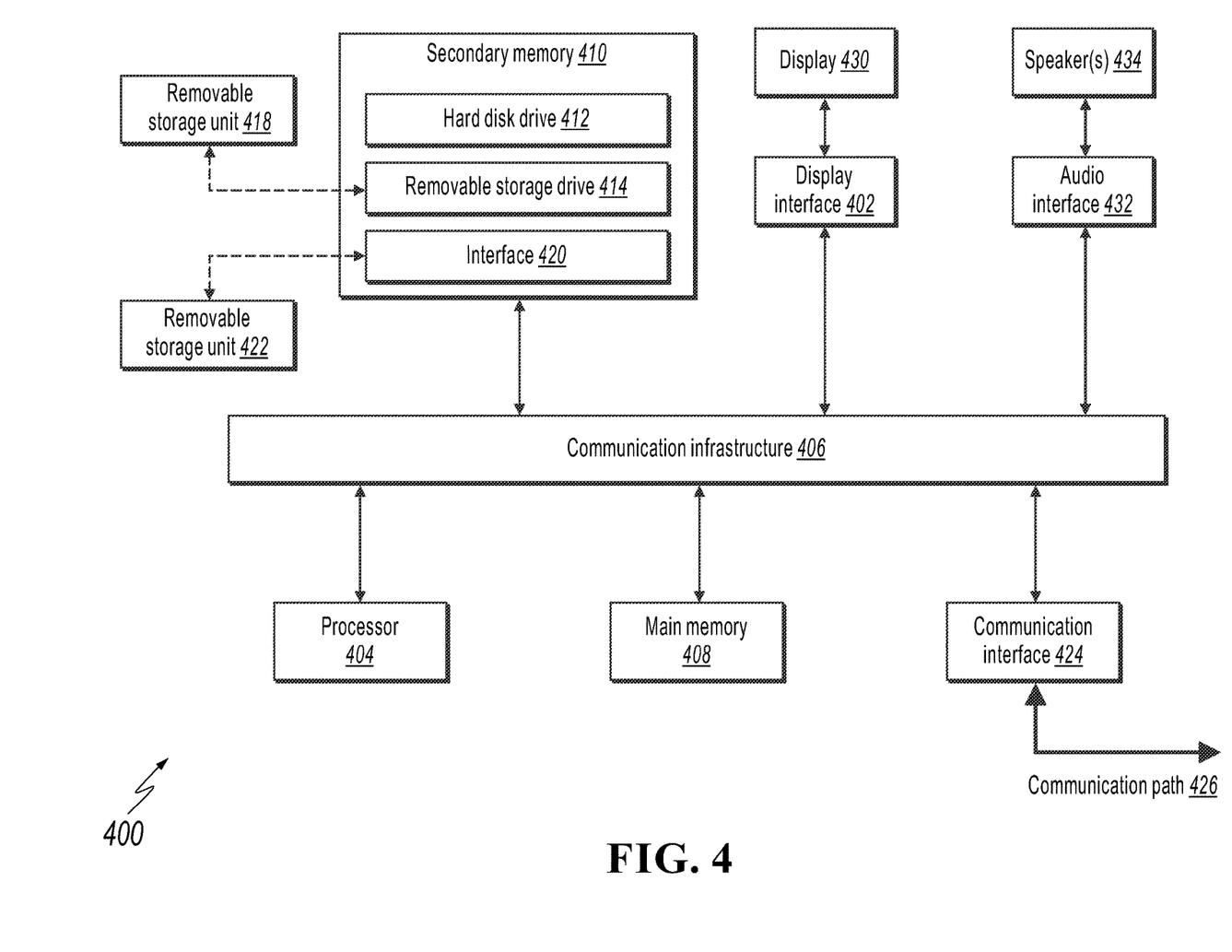
FIG. 4 shows a schematic diagram of a computer system suitable for use in executing at least some steps of the authentication method.

FIG. 4 shows a schematic diagram of a computer system suitable for use in executing at least some steps of the authentication method.

The following description of the computer system/computing device 400 is provided by way of example only and is not intended to be limiting.

As shown in FIG. 4, the example computing device 400 includes a processor 404 for executing software routines. Although a single processor is shown for the sake of clarity, the computing device 400 may also include a multi-processor system. The processor 404 is connected to a communication infrastructure 406 for communication with other components of the computing device 400. The communication infrastructure 406 may include, for example, a communications bus, cross-bar, or network.

The computing device 400 further includes a main memory 408, such as a random access memory (RAM), and a secondary memory 410. The secondary memory 410 may include, for example, a hard disk drive 412 and/or a removable storage drive 414, which may include a magnetic tape drive, an optical disk drive, or the like. The removable storage drive 414 reads from and/or writes to a removable storage unit 418 in a well-known manner. The removable storage unit 418 may include a magnetic tape, optical disk, or the like, which is read by and written to by removable storage drive 414. As will be appreciated by persons skilled in the relevant art(s), the removable storage unit 418 includes a computer readable storage medium having stored therein computer executable program code instructions and/or data.

In an alternative embodiment, the secondary memory 410 may additionally or alternatively include other similar devices for allowing computer programs or other instructions to be loaded into the computing device 400. Such devices can include, for example, a removable storage unit 422 and an interface 420. Examples of a removable storage unit 422 and interface 420 include a removable memory chip (such as an EPROM or PROM) and associated socket, and other removable storage units 422 and interfaces 420 which allow software and data to be transferred from the removable storage unit 422 to the computer system 400.

The computing device 400 also includes at least one communication interface 424. The communication interface 424 allows software and data to be transferred between computing device 400 and external devices via a communication path 426. In various embodiments, the communication interface 424 permits data to be transferred between the computing device 400 and a data communication network, such as a public data or private data communication network. The communication interface 424 may be used to exchange data between different computing devices 400 which such computing devices 400 form part of an interconnected computer network. Examples of a communication interface 424 can include a modem, a network interface (such as an Ethernet card), a communication port, an antenna with associated circuitry and the like. The communication interface 424 may be wired or may be wireless. Software and data transferred via the communication interface 424 are in the form of signals which can be electronic, electromagnetic, optical or other signals capable of being received by communication interface 424. These signals are provided to the communication interface via the communication path 426.

Optionally, the computing device 400 further includes a display interface 402 which performs operations for rendering images to an associated display 430 and an audio interface 432 for performing operations for playing audio content via associated speaker(s) 434.

As used herein, the term "computer program product" may refer, in part, to removable storage unit 418, removable storage unit 422, a hard disk installed in hard disk drive 412, or a carrier wave carrying software over communication path 426 (wireless link or cable) to communication interface 424. Computer readable storage media refers to any non-transitory tangible storage medium that provides recorded instructions and/or data to the computing device 400 for execution and/or processing. Examples of such storage media include floppy disks, magnetic tape, CD-ROM, DVD, Blu-ray' Disc, a hard disk drive, a ROM or integrated circuit, USB memory, a magneto-optical disk, or a computer readable card such as a PCMCIA card and the like, whether or not such devices are internal or external of the computing device 400. Examples of transitory or non-tangible computer readable transmission media that may also participate in the provision of software, application programs, instructions and/or data to the computing device 400 include radio or infra-red transmission channels as well as a network connection to another computer or networked device, and the Internet or Intranets including e-mail transmissions and information recorded on Websites and the like.

The computer programs (also called computer program code) are stored in main memory 408 and/or secondary memory 410. Computer programs can also be received via the communication interface 424. Such computer programs, when executed, enable the computing device 400 to perform one or more features of embodiments discussed herein. In various embodiments, the computer programs, when executed, enable the processor 404 to perform features of the above-described embodiments. Accordingly, such computer programs represent controllers of the computer system 400.

Software may be stored in a computer program product and loaded into the computing device 400 using the removable storage drive 414, the hard disk drive 412, or the interface 420. Alternatively, the computer program product may be downloaded to the computer system 400 over the communications path 426. The software, when executed by the processor 404, causes the computing device 400 to perform functions of embodiments described herein.

It is to be understood that the embodiment of FIG. 4 is presented merely by way of example. Therefore, in some embodiments one or more features of the computing device 400 may be omitted. Also, in some embodiments, one or more features of the computing device 400 may be combined together. Additionally, in some embodiments, one or more features of the computing device 400 may be split into one or more component parts.

This specification uses the term "configured to" in connection with systems, devices, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

Figure 5:
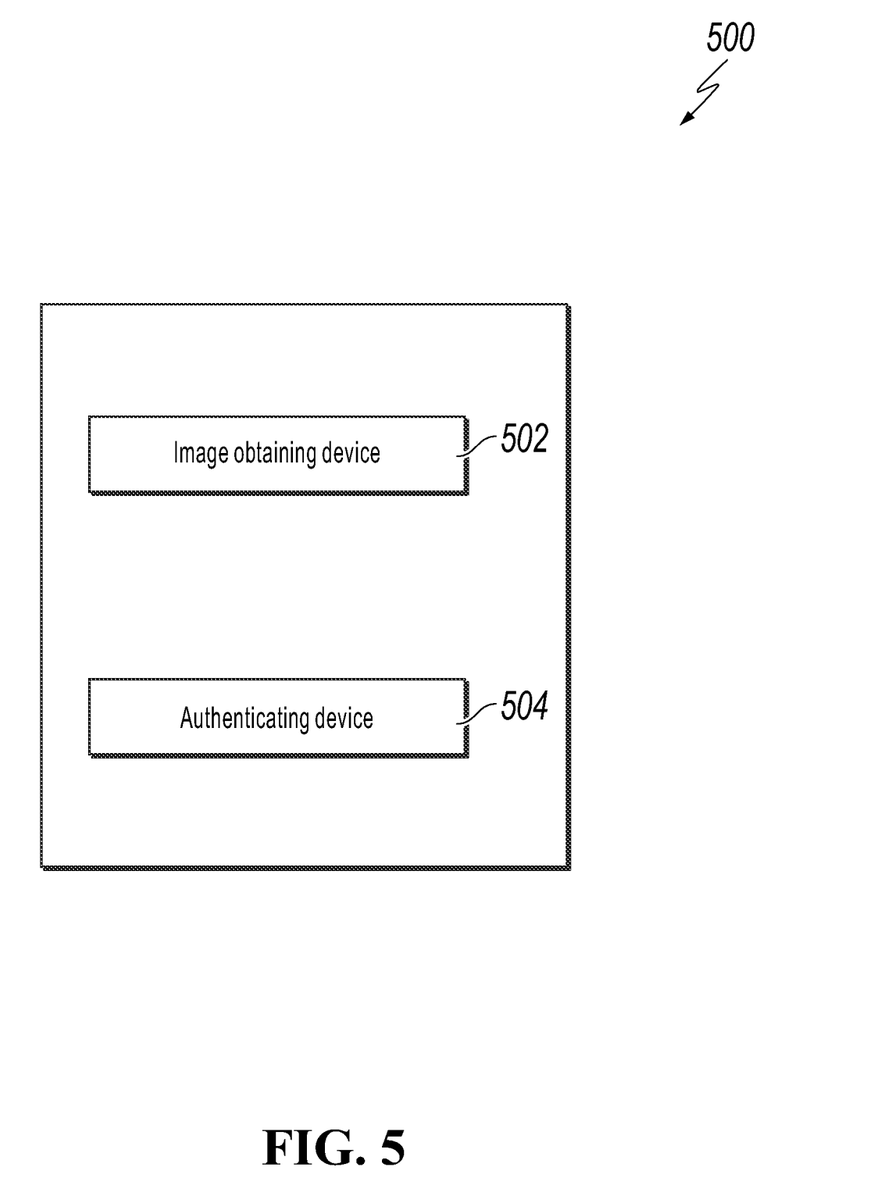
FIG. 5 is a schematic diagram illustrating an example of an authentication system, according to an embodiment.

FIG. 5 is a schematic diagram 500 illustrating an example of an authentication system, according to an embodiment. The authentication system comprises an image obtaining device 502 to obtain a first image and to obtain a second image. The first image is an image of an identification (ID) document captured when the ID document is tilted at a first angle relative to a light source whilst a light from the light source is projected thereon. The second image is an image of the ID document captured when the ID document is tilted at a second angle relative to the light source whilst the light from the light source is projected thereon. Further, the authentication system comprises an authenticating device 504 to authenticate the ID document based on identification of a first illuminated region and a second illuminated region, and a comparison between a first position of the first illuminated region and a second position of the second illuminated region. The first illuminated region is associated with the first image and the second illuminated region is associated with the second image.

The image obtaining device 502 used to obtain the second image can be the same device or a different device as the image obtaining device 502 used to obtain the first image. The image obtaining device 502 may comprise an image capturing device (e.g. a camera of a mobile phone) and a processor for executing software routines associated with image processing method(s) and/or system(s). The authenticating device 504 can be implemented using the same processor or a different processor for executing different sets of software routines to authenticate the ID document based on the identification of a first illuminated region and a second illuminated region and a comparison between a first position of the first illuminated region and a second position of the second illuminated region. The light source can be obtained by executing a function (e.g. a flash or flashlight function) of a mobile phone.

The first angle relative to the light source which the ID document is tilted at can be between 60 degrees and 80 degrees or 100 degrees and 120 degrees, and the second angle relative to the light source which the ID document is tilted at can be between 60 degrees and 80 degrees or 100 degrees and 120 degrees. The second angle may be different from the first angle.

According to one embodiment, the light can be a flashlight.

The authentication system may further comprise an image processing device to perform image processing, using an image erosion method or an image dilation method, on the first image. The image processing device may also perform the image processing, using the image erosion method or the image dilation method, on the second image.

The authenticating device may further authenticate the ID document on a condition that the first illuminated region and the second illuminated region are identified, and on another condition that the first position of the first illuminated region and the second position of the second illuminated region are different.

The first angle relative to the light source which the ID document is tilted at may be smaller than the second angle relative to the light source which the ID document is tilted at. The authenticating device may further authenticate the ID document on a condition that the first position of the first illuminated region has a shorter distance from a tilt axis than the second position of the second illuminated region from the tilt axis. The tilt axis may correspond to a width of the ID document, a height of the ID document, a diagonal axis across the ID document, or any other axis across the ID document.

According to one embodiment, the authenticating device may comprise a coordinate determining device to determine a first coordinate. The first coordinate may correspond to a first center point of the first illuminated region. The coordinate determining device may also determine a second coordinate. The second coordinate may correspond to a second center point of the second illuminated region. The authenticating device may further authenticate the ID document on a condition that the first coordinate is different from the second coordinate.

According to one embodiment, a computing system for authentication of ID documents is provided. The computing system comprises at least one processor. The computing system also comprises a non-transitory computer-readable storage medium coupled to the at least one processor and storing programming instructions for execution by the at least one processor, the programming instructions instruct the at least one processor to obtain a first image. The first image is an image of an identification (ID) document captured when the ID document is tilted at a first angle relative to a light source whilst a light from the light source is projected thereon. Further, the programming instructions instruct the at least one processor to obtain a second image. The second image is an image of the ID document captured when the ID document is tilted at a second angle relative to the light source whilst the light from the light source is projected thereon. The programming instructions also instruct the at least one processor to authenticate the ID document based on identification of a first illuminated region and a second illuminated region, and a comparison between a first position of the first illuminated region and a second position of the second illuminated region. The first illuminated region is associated with the first image and the second illuminated region is associated with the second image.

It will be appreciated by a person skilled in the art that numerous variations and/or modifications may be made to the embodiments. The present embodiments are, therefore, to be considered in all respects to be illustrative and not restrictive.

What is claimed is:

1. A computer-implemented method for authentication, comprising:
    obtaining a first image, wherein the first image is an image of an identification (ID) document captured when the ID document is tilted at a first angle relative to a light source while a light from the light source is projected on the ID document;
    obtaining a second image, wherein the second image is another image of the ID document captured when the ID document is tilted at a second angle relative to the light source while the light from the light source is projected on the ID document; and
    authenticating the ID document based on performing operations comprising:
        identifying a first illuminated region of the first image and a second illuminated region of the second image, wherein the first illuminated region is brighter than a remaining area of the first image other than the first illuminated region, and the second illuminated region is brighter than a remaining area of the second image other than the second illuminated region and
        comparing a first position of the first illuminated region and a second position of the second illuminated region to determine whether the first position and the second position are a same position in the ID document, wherein the first position is a center point of the first illuminated region and the second position is a center point of the second illuminated region.

2. The computer-implemented method of claim 1, wherein:
    the first angle relative to the light source which the ID document is tilted at is between 60 degrees and 80 degrees or 100 degrees and 120 degrees; and
    the second angle relative to the light source which the ID document is tilted at is between 60 degrees and 80 degrees or 100 degrees and 120 degrees, and wherein the second angle is different from the first angle.

3. The computer-implemented method of claim 1, wherein the light is a flashlight.

4. The computer-implemented method of claim 1, further comprising:
    processing, using an image erosion method or an image dilation method, the first image; and
    processing, using the image erosion method or the image dilation method, the second image.

5. The computer-implemented method of claim 1, wherein authenticating the ID document comprises authenticating the ID document on a condition that the first illuminated region and the second illuminated region are identified, and on another condition that the first position of the first illuminated region and the second position of the second illuminated region are different.

6. The computer-implemented method of claim 1, wherein:
    the first angle relative to the light source which the ID document is tilted at is smaller than the second angle relative to the light source which the ID document is tilted at; and
    authenticating the ID document comprises authenticating the ID document on a condition that the first position of the first illuminated region has a shorter distance from a tilt axis than the second position of the second illuminated region from the tilt axis.

7. The computer-implemented method of claim 1, wherein authenticating the ID document comprises:
    determining a first coordinate, wherein the first coordinate corresponds to a first center point of the first illuminated region;
    determining a second coordinate, wherein the second coordinate corresponds to a second center point of the second illuminated region; and
    authenticating the ID document on a condition that the first coordinate is different from the second coordinate.

8. A non-transitory computer-readable medium storing one or more instructions executable by a computer system to perform operations for authentication, comprising:
    obtaining a first image, wherein the first image is an image of an identification (ID) document captured when the ID document is tilted at a first angle relative to a light source while a light from the light source is projected on the ID document;
    obtaining a second image, wherein the second image is another image of the ID document captured when the ID document is tilted at a second angle relative to the light source while the light from the light source is projected on the ID document; and
    authenticating the ID document based on performing operations comprising:
        identifying a first illuminated region of the first image and a second illuminated region of the second image, wherein the first illuminated region is brighter than a remaining area of the first image other than the first illuminated region, and the second illuminated region is brighter than a remaining area of the second image other than the second illuminated region and
        comparing a first position of the first illuminated region and a second position of the second illuminated region to determine whether the first position and the second position are a same position in the ID document, wherein the first position is a center point of the first illuminated region and the second position is a center point of the second illuminated region.

9. The non-transitory computer-readable medium of claim 8, wherein:
the first angle relative to the light source which the ID document is tilted at is between 60 degrees and 80 degrees or 100 degrees and 120 degrees; and
the second angle relative to the light source which the ID document is tilted at is between 60 degrees and 80 degrees or 100 degrees and 120 degrees, and wherein the second angle is different from the first angle.

10. The non-transitory computer-readable medium of claim 8, wherein the light is a flashlight.

11. The non-transitory computer-readable medium of claim 8, further comprising:
processing, using an image erosion method or an image dilation method, the first image; and
processing, using the image erosion method or the image dilation method, the second image.

12. The non-transitory computer-readable medium of claim 8, wherein authenticating the ID document comprises authenticating the ID document on a condition that the first illuminated region and the second illuminated region are identified, and on another condition that the first position of the first illuminated region and the second position of the second illuminated region are different.

13. The non-transitory computer-readable medium of claim 8, wherein:
the first angle relative to the light source which the ID document is tilted at is smaller than the second angle relative to the light source which the ID document is tilted at; and
authenticating the ID document comprises authenticating the ID document on a condition that the first position of the first illuminated region has a shorter distance from a tilt axis than the second position of the second illuminated region from the tilt axis.

14. The non-transitory computer-readable medium of claim 8, wherein authenticating the ID document comprises:
determining a first coordinate, wherein the first coordinate corresponds to a first center point of the first illuminated region;
determining a second coordinate, wherein the second coordinate corresponds to a second center point of the second illuminated region; and
authenticating the ID document on a condition that the first coordinate is different from the second coordinate.

15. A computer-implemented system for authentication, comprising:
one or more computers; and
one or more computer memory devices interoperably coupled with the one or more computers and having tangible, non-transitory, machine-readable media storing one or more instructions that, when executed by the one or more computers, cause the one or more computers to perform one or more operations comprising:
obtaining a first image, wherein the first image is an image of an identification (ID) document captured when the ID document is tilted at a first angle relative to a light source while a light from the light source is projected on the ID document;
obtaining a second image, wherein the second image is another image of the ID document captured when the ID document is tilted at a second angle relative to the light source while the light from the light source is projected on the ID document; and
authenticating the ID document based on performing operations comprising:
identifying a first illuminated region of the first image and a second illuminated region of the second image, wherein the first illuminated region is brighter than a remaining area of the first image other than the first illuminated region, and the second illuminated region is brighter than a remaining area of the second image other than the second illuminated region and
comparing a first position of the first illuminated region and a second position of the second illuminated region to determine whether the first position and the second position are a same position in the ID document, wherein the first position is a center point of the first illuminated region and the second position is a center point of the second illuminated region.

16. The computer-implemented system of claim 15, wherein:
the first angle relative to the light source which the ID document is tilted at is between 60 degrees and 80 degrees or 100 degrees and 120 degrees; and
the second angle relative to the light source which the ID document is tilted at is between 60 degrees and 80 degrees or 100 degrees and 120 degrees, and wherein the second angle is different from the first angle.

17. The computer-implemented system of claim 15, further comprising:
processing, using an image erosion method or an image dilation method, the first image; and
processing, using the image erosion method or the image dilation method, the second image.

18. The computer-implemented system of claim 15, wherein authenticating the ID document comprises authenticating the ID document on a condition that the first illuminated region and the second illuminated region are identified, and on another condition that the first position of the first illuminated region and the second position of the second illuminated region are different.

19. The computer-implemented system of claim 15, wherein:
the first angle relative to the light source which the ID document is tilted at is smaller than the second angle relative to the light source which the ID document is tilted at; and
authenticating the ID document comprises authenticating the ID document on a condition that the first position of the first illuminated region has a shorter distance from a tilt axis than the second position of the second illuminated region from the tilt axis.

20. The computer-implemented system of claim 15, wherein authenticating the ID document comprises:
determining a first coordinate, wherein the first coordinate corresponds to a first center point of the first illuminated region;
determining a second coordinate, wherein the second coordinate corresponds to a second center point of the second illuminated region; and
authenticating the ID document on a condition that the first coordinate is different from the second coordinate.

* * * * *